United States Patent
Bhoovaraghavan et al.

(10) Patent No.: US 9,430,522 B2
(45) Date of Patent: *Aug. 30, 2016

(54) NAVIGATING PERFORMANCE DATA FROM DIFFERENT SUBSYSTEMS

(71) Applicant: Microsoft Technology Licensing, LLC, Redmond, WA (US)

(72) Inventors: Mukundan Bhoovaraghavan, Hyderabad (IN); Corrina Black, Snohomish, WA (US); Raghuram Lanka, Hyderabad (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/874,840

(22) Filed: Oct. 5, 2015

(65) Prior Publication Data

US 2016/0026679 A1 Jan. 28, 2016

Related U.S. Application Data

(63) Continuation of application No. 13/114,052, filed on May 24, 2011, now Pat. No. 9,165,029.

(60) Provisional application No. 61/474,509, filed on Apr. 12, 2011.

(51) Int. Cl.
| | | |
|---|---|---|
| *G06F 11/00* | (2006.01) | |
| *G06F 9/44* | (2006.01) | |
| *G06F 3/048* | (2013.01) | |
| *G06F 17/30* | (2006.01) | |
| *G06F 11/32* | (2006.01) | |
| *G06F 3/0482* | (2013.01) | |
| *G06F 3/0484* | (2013.01) | |
| *G06F 11/34* | (2006.01) | |

(52) U.S. Cl.
CPC ....... *G06F 17/30398* (2013.01); *G06F 3/0482* (2013.01); *G06F 3/04842* (2013.01); *G06F 11/32* (2013.01); *G06F 11/3409* (2013.01); *G06F 11/3466* (2013.01); *G06F 11/3476* (2013.01); *G06F 2201/81* (2013.01)

(58) Field of Classification Search
None
See application file for complete search history.

(56) References Cited

U.S. PATENT DOCUMENTS

| | | | |
|---|---|---|---|
| 6,374,144 B1 | 4/2002 | Viviani et al. | |
| 6,760,903 B1 * | 7/2004 | Morshed | G06F 11/3466 717/130 |

(Continued)

OTHER PUBLICATIONS

"Instrumenting Windows CE Device Drivers with Remote Performance Monitor", Retrieved From <<https://msdn.microsoft.com/en-us/library/ms834409.aspx, Aug. 2001, 9 Pages.

(Continued)

*Primary Examiner* — Insun Kang
(74) *Attorney, Agent, or Firm* — Kevin Sullivan; Kate Drakos; Micky Minhas

(57) ABSTRACT

Performance data can be collected from different runtime environment subsystems of a computer system while the computer system is running a program in the runtime environment. A visualization model can be displayed, and a visual query of the integrated data can be received at the visualization model. Queried data can be compiled and displayed in response to the visual query. The queried data can be drilled into in response to user input. In response to a navigation request, navigation can lead to a programming element related to a portion of the queried data.

20 Claims, 8 Drawing Sheets

(56) References Cited

U.S. PATENT DOCUMENTS

| | | | |
|---|---|---|---|
| 7,603,334 B2 | 10/2009 | Beloesch | |
| 7,707,145 B2 | 4/2010 | Mischke | |
| 7,836,428 B2 | 11/2010 | Mitchell et al. | |
| 7,926,024 B2 | 4/2011 | Clarke | |
| 7,992,137 B2* | 8/2011 | Rideout | G06F 11/362 714/25 |
| 8,001,531 B1* | 8/2011 | Rideout | G06F 11/362 709/217 |
| 8,006,232 B1* | 8/2011 | Rideout | G06F 11/362 709/217 |
| 8,136,124 B2* | 3/2012 | Kosche | G06F 11/3447 714/47.1 |
| 8,296,744 B2 | 10/2012 | Langworthy et al. | |
| 8,464,221 B2* | 6/2013 | Zheng | G06F 11/3664 717/124 |
| 8,667,470 B2* | 3/2014 | Lin | G06F 8/10 717/109 |
| 8,762,951 B1* | 6/2014 | Kosche | G06F 11/3476 717/127 |
| 8,813,055 B2* | 8/2014 | Kosche | G06F 11/3612 717/130 |
| 2002/0087949 A1* | 7/2002 | Golender | G06F 9/4446 717/124 |
| 2002/0152305 A1 | 10/2002 | Jackson et al. | |
| 2005/0086207 A1 | 4/2005 | Heuer et al. | |
| 2006/0048101 A1* | 3/2006 | Krassovsky | G06F 11/3409 717/127 |
| 2006/0130016 A1 | 6/2006 | Wagner | |
| 2006/0184380 A1 | 8/2006 | Hall et al. | |
| 2006/0218543 A1* | 9/2006 | Boger | G06F 11/3612 717/157 |
| 2006/0236368 A1 | 10/2006 | Raja et al. | |
| 2007/0079289 A1 | 4/2007 | MacCaux | |
| 2007/0079290 A1 | 4/2007 | Roth | |
| 2007/0079291 A1 | 4/2007 | Roth | |
| 2007/0083631 A1 | 4/2007 | Maccaux | |
| 2007/0083868 A1 | 4/2007 | Sankaranarayan et al. | |
| 2008/0109796 A1 | 5/2008 | Kosche | |
| 2008/0120268 A1 | 5/2008 | Ruiz et al. | |
| 2008/0127109 A1* | 5/2008 | Simeon | G06F 11/3409 717/128 |
| 2008/0127116 A1* | 5/2008 | Kosche | G06F 11/328 717/130 |
| 2008/0127149 A1* | 5/2008 | Kosche | G06F 8/443 717/158 |
| 2008/0177756 A1 | 7/2008 | Kosche et al. | |
| 2008/0209402 A1* | 8/2008 | Parkinson | G06F 11/3664 717/124 |
| 2009/0138858 A1 | 5/2009 | Livshits et al. | |
| 2009/0199160 A1* | 8/2009 | Vaitheeswaran | G06F 11/3414 717/124 |
| 2009/0234941 A1 | 9/2009 | Ammerlaan et al. | |
| 2009/0271769 A1* | 10/2009 | Krauss | G06F 11/3409 717/133 |
| 2010/0064279 A1* | 3/2010 | Stewart | G06F 11/3466 717/122 |
| 2010/0088404 A1 | 4/2010 | Mani et al. | |
| 2010/0088665 A1 | 4/2010 | Langworthy et al. | |
| 2010/0162215 A1 | 6/2010 | Purcell et al. | |
| 2010/0235349 A1 | 9/2010 | Kuno et al. | |
| 2010/0287536 A1 | 11/2010 | Chung et al. | |
| 2010/0332294 A1 | 12/2010 | Geis et al. | |
| 2011/0010715 A1 | 1/2011 | Papakipos et al. | |
| 2011/0040808 A1* | 2/2011 | Joy | G06F 8/20 707/812 |
| 2011/0138368 A1* | 6/2011 | Krauss | G06F 11/3466 717/133 |
| 2011/0145795 A1* | 6/2011 | Khanapurkar | G06F 11/3414 717/126 |
| 2011/0265060 A1* | 10/2011 | Fritzsche | G06F 8/10 717/104 |
| 2011/0283266 A1* | 11/2011 | Gallagher | G06F 9/44 717/130 |
| 2012/0079456 A1* | 3/2012 | Kannan | G06F 8/77 717/124 |
| 2012/0222017 A1* | 8/2012 | Hinkle | G06F 11/30 717/130 |
| 2012/0266143 A1 | 10/2012 | Bhoovaraghavan et al. | |
| 2012/0324470 A1 | 12/2012 | Jamjoom et al. | |

OTHER PUBLICATIONS

"Performance Modeling and Dynamic Pipeline Optimization", Retrieved From <<http://vis.lbl.gov/Research/DiVA/Performance/index.html>>, Retrieved Date: Apr. 8, 2011, 3 Pages.

"WPF Performance Suite", Retrieved From <<https://msdn.microsoft.com/en-us/library/aa969767(v=vs.110).aspx>> Retrieved Date: Apr. 13, 2011, pp. 1-13.

"Final Rejection Received for U.S. Appl. No. 13/114,052", Mailed Date: Dec. 1, 2014, 33 Pages.

"Final Rejection Received for U.S. Appl. No. 13/114,052", Mailed Date: Jan. 10, 2014, 23 Pages.

"Non-Final Rejection Received in U.S. Appl. No. 13/114,052", Mailed Date: Jul. 3, 2014, 31 Pages.

"Non-Final Rejection Received in U.S. Appl. No. 13/114,052", Mailed Date: Aug. 7, 2013, 25 Pages.

"Notice of Allowance Received in U.S. Appl. No. 13/114,052", Mailed Date: Jul. 28, 2015, 2 Pages.

"Notice of Allowance Received in U.S. Appl. No. 13/114,052", Mailed Date: Jun. 22, 2015, 19 Pages.

"Office Action Issued for U.S. Appl. No. 13/114,056", Mailed Date: Jun. 10, 2014, 24 Pages.

"Office Action Issued for U.S. Appl. No. 13/114,056", Mailed Date: Jan. 24, 2014, 23 Pages.

"Office Action Issued for U.S. Appl. No. 13/114,056", Mailed Date: Jul. 23, 2013, 22 Pages.

Irvin, R. Bruce, "Performance Measurement Tools for High-Level Parallel Programming Languages", Retrieved From <<http://citeseerx.ist.psu.edu/viewdoc/download?doi=10.1.1.31.7851&rep=rep1&type=pdf>>, 1995, 110 Pages.

Jakiela, Hank, "Performance Visualization of a Distributed System: A Case Study", In Journal Computer, vol. 28 Issue 11, Nov. 1995, 7 Pages.

Karavanic, et al., "Integrated Visualization of Parallel Program Performance Data", Retrieved From <<https://www.researchgate.net/profile/Barton_Miller/publication/220276761_Integrated_Visualization_of_Parallel_Program_Performance_Data/links/02e7e5176eff8bf00a000000.pdf>>>, Apr. 1997,15 Pages.

Lippett, Mark, "Using Dynamic Run-Time Scheduling to Improve the Price-Performance-Power Efficiency of Heterogeneous Multicore SaCs", Retrieved From <<http://www.design-reuse.com/articles/13179/using-dynamic-run-time-scheduling-to-improve-the-price-performance-power-efficiency-of-heterogeneous-multicore-socs.html>> Retrieved Date: Apr. 8, 2011, 6 Pages.

Polyviou, et al., "A Relationally Complete Visual Query Language for Heterogeneous Data Sources and Pervasive Querying", In Proceedings of the 21st International Conference on Data Engineering, Apr. 2005, 12 Pages.

Shultz, Greg, "Task Manager's Performance Tab More Useful in Windows Vista", Retrieved From <<http://www.techrepublic.com/article/task-managers-performance-tab-more-useful-in-windows-vista/>>, Feb. 28, 2007, 10 Pages.

Sima, et al., "Runtime Memory Allocation in a Heterogeneous Reconfigurable Platform", In International Conference on Reconfigurable Computing and FPGAs, Dec. 9, 2009, 6 Pages.

Zaino, Jennifer, "Data Analysis Gets A New, Graphical Look", Retrieved From <<http://www.informationweek.com/news/159901718>> Mar. 17, 2005, 4 Pages.

* cited by examiner

SOFTWARE 180 IMPLEMENTING NAVIGATION OF PERFORMANCE DATA FROM DIFFERENT SUBSYSTEMS

NAVIGATING PERFORMANCE DATA FROM DIFFERENT SUBSYSTEMS

RELATED APPLICATIONS

The present application is a continuation of U.S. application Ser. No. 13/114,052, filed May 24, 2011, and entitled NAVIGATING PERFORMANCE DATA FROM DIFFERENT SUBSYSTEMS, which claims priority to U.S. Provisional Patent Application No. 61/474,509, filed Apr. 12, 2011, entitled NAVIGATING PERFORMANCE DATA FROM DIFFERENT SUBSYSTEM, both of which are incorporated herein by reference. If any disclosures are incorporated herein by reference and such incorporated disclosures conflict in part or whole with the present disclosure, then to the extent of conflict, and/or broader disclosure, and/or broader definition of terms, the present disclosure controls. If such incorporated disclosures conflict in part or whole with one another, then to the extent of conflict, the later-dated disclosure controls.

BACKGROUND

Computer runtime environments can host programs while the programs are running. For example, a runtime environment may be a virtual environment running in a host computer system. Runtime environments can include multiple subsystems having different mechanisms for performing a variety of tasks.

Profilers are computing tools that are used to collect performance information about running computer programs and present the collected information to a user. This is typically done with a profiler component that runs at the same time as a computer program to collect performance data for the computer program. The profiler can present such collected information to a developer to provide the developer with information about the performance of the running program.

SUMMARY

The descriptions below relate to tools and techniques for navigating integrated performance data from different runtime environment subsystems and arriving at a programming element (i.e., a component of the computer program that can be modified by user input from a program developer, such as scripts, source code, etc.). As used herein, different runtime environment subsystems are different types of subsystems of a runtime environment, which is an environment in which a program is run. For example, different subsystems could include a graphics subsystem, a user code execution subsystem, a media decoding subsystem, a networking subsystem, and an overall programming environment (an operating system abstraction layer that manages a lifetime of a running program). Of course, there can also be other different subsystems. For example, an operating system itself could be another example of a different subsystem if the scope of a system being profiled were to include the operating system.

Navigation of performance data may include displaying a visualization model and performing visual queries of the performance data. A visualization model is a model that includes graphical data representations (e.g., data graphs), and may also include other representations, such as textual representations (e.g., tabular data). A visual query is a query that is initiated in response to user input directed at and selecting a displayed visual element (graphical element, textual element, combined graphical/textual element, etc.).

In one embodiment, the tools and techniques can include collecting performance data from different runtime environment subsystems of a computer system while the computer system is running a program in the runtime environment. A visualization model can be displayed, and a visual query of the integrated data can be received at the visualization model. Queried data can be compiled in response to the visual query. In response to user input, the tools and techniques can include drilling down into the queried data. In response to a navigation request, the tools and techniques can include navigating to a programming element related to a portion of the queried data.

This Summary is provided to introduce a selection of concepts in a simplified form. The concepts are further described below in the Detailed Description. This Summary is not intended to identify key features or essential features of the claimed subject matter, nor is it intended to be used to limit the scope of the claimed subject matter. Similarly, the invention is not limited to implementations that address the particular techniques, tools, environments, disadvantages, or advantages discussed in the Background, the Detailed Description, or the attached drawings.

DETAILED DESCRIPTION

Figure 1:
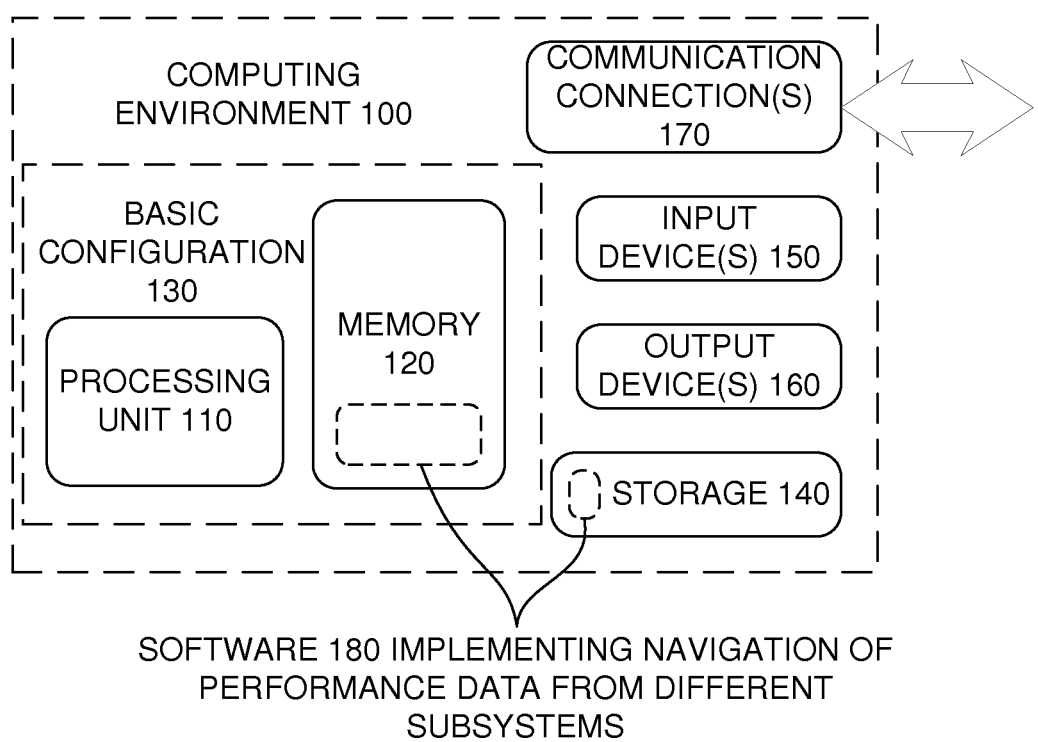
FIG. 1 is a block diagram of a suitable computing environment in which one or more of the described embodiments may be implemented.

Embodiments described herein are directed to techniques and tools for improved navigating of integrated performance data from different runtime environment subsystems. Such improvements may result from the use of various techniques and tools separately or in combination.

Such techniques and tools may include presenting an interactive visualization model for integrated data from various subsystems. The visualization model can allow users to visually query the data, navigate across queried data, and drill down into the data to reveal additional information about a performance problem. As used herein, a performance problem or performance issue is a condition where the program's performance fails a specified test, benchmark, or rule that is used for identifying such issues or problems. The model can allow users to navigate to a programming element related to a portion of the queried data, such as a programming element that contributes, at least in part, to an identified performance issue.

Accordingly, one or more benefits can be realized from the tools and techniques described herein. For example, the tools and techniques can provide a visualization of a performance problem, and can allow a developer to drill down in the performance data to reveal more information about the problem, even if that performance data comes from different runtime subsystems. Additionally, the tools and techniques can correlate a performance problem to a programming element, which the developer can edit to address the performance problem.

The subject matter defined in the appended claims is not necessarily limited to the benefits described herein. A particular implementation of the invention may provide all, some, or none of the benefits described herein. Although operations for the various techniques are described herein in a particular, sequential order for the sake of presentation, it should be understood that this manner of description encompasses rearrangements in the order of operations, unless a particular ordering is required. For example, operations described sequentially may in some cases be rearranged or performed concurrently. Moreover, for the sake of simplicity, flowcharts may not show the various ways in which particular techniques can be used in conjunction with other techniques.

Techniques described herein may be used with one or more of the systems described herein and/or with one or more other systems. For example, the various procedures described herein may be implemented with hardware or software, or a combination of both. For example, dedicated hardware implementations, such as application specific integrated circuits, programmable logic arrays and other hardware devices, can be constructed to implement at least a portion of one or more of the techniques described herein. Applications that may include the apparatus and systems of various embodiments can broadly include a variety of electronic and computer systems. Techniques may be implemented using two or more specific interconnected hardware modules or devices with related control and data signals that can be communicated between and through the modules, or as portions of an application-specific integrated circuit. Additionally, the techniques described herein may be implemented by software programs executable by a computer system. As an example, implementations can include distributed processing, component/object distributed processing, and parallel processing. Moreover, virtual computer system processing can be constructed to implement one or more of the techniques or functionality, as described herein.

I. Exemplary Computing Environment

FIG. 1 illustrates a generalized example of a suitable computing environment (100) in which one or more of the described embodiments may be implemented. For example, one or more such computing environments can host the program and/or profiler component(s) discussed herein. Generally, various different general purpose or special purpose computing system configurations can be used. Examples of well-known computing system configurations that may be suitable for use with the tools and techniques described herein include, but are not limited to, server farms and server clusters, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

The computing environment (100) is not intended to suggest any limitation as to scope of use or functionality of the invention, as the present invention may be implemented in diverse general-purpose or special-purpose computing environments.

With reference to FIG. 1, the computing environment (100) includes at least one processing unit (110) and at least one memory (120). In FIG. 1, this most basic configuration (130) is included within a dashed line. The processing unit (110) executes computer-executable instructions and may be a real or a virtual processor. In a multi-processing system, multiple processing units execute computer-executable instructions to increase processing power. The at least one memory (120) may be volatile memory (e.g., registers, cache, RAM), non-volatile memory (e.g., ROM, EEPROM, flash memory), or some combination of the two. The at least one memory (120) stores software (180) implementing navigation of performance data from different subsystems.

Although the various blocks of FIG. 1 are shown with lines for the sake of clarity, in reality, delineating various components is not so clear and, metaphorically, the lines of FIG. 1 and the other figures discussed below would more accurately be grey and blurred. For example, one may consider a presentation component such as a display device to be an I/O component. Also, processors have memory. The inventors hereof recognize that such is the nature of the art and reiterate that the diagram of FIG. 1 is merely illustrative of an exemplary computing device that can be used in connection with one or more embodiments of the present invention. Distinction is not made between such categories as "workstation," "server," "laptop," "handheld device," etc., as all are contemplated within the scope of FIG. 1 and reference to "computer," "computing environment," or "computing device."

A computing environment (100) may have additional features. In FIG. 1, the computing environment (100) includes storage (140), one or more input devices (150), one or more output devices (160), and one or more communication connections (170). An interconnection mechanism (not shown) such as a bus, controller, or network interconnects the components of the computing environment (100). Typically, operating system software (not shown) provides an operating environment for other software executing in the computing environment (100), and coordinates activities of the components of the computing environment (100).

The storage (140) may be removable or non-removable, and may include computer-readable storage media such as magnetic disks, magnetic tapes or cassettes, CD-ROMs, CD-RWs, DVDs, or any other medium which can be used to store information and which can be accessed within the computing environment (100). The storage (140) stores instructions for the software (180).

The input device(s) (150) may be a touch input device such as a keyboard, mouse, pen, or trackball; a voice input device; a scanning device; a network adapter; a CD/DVD reader; or another device that provides input to the computing environment (100). The output device(s) (160) may be a display, printer, speaker, CD/DVD-writer, network adapter, or another device that provides output from the computing environment (100).

The communication connection(s) (170) enable communication over a communication medium to another computing entity. Thus, the computing environment (100) may operate in a networked environment using logical connections to one or more remote computing devices, such as a personal computer, a server, a router, a network PC, a peer device or another common network node. The communication medium conveys information such as data or computer-executable instructions or requests in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The tools and techniques can be described in the general context of computer-readable media, which may be storage media or communication media. Computer-readable storage media are any available storage media that can be accessed within a computing environment, but the term computer-readable storage media does not refer to propagated signals per se. By way of example, and not limitation, with the computing environment (100), computer-readable storage media include memory (120), storage (140), and combinations of the above.

The tools and techniques can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules in various embodiments. Computer-executable instructions for program modules may be executed within a local or distributed computing environment. In a distributed computing environment, program modules may be located in both local and remote computer storage media.

For the sake of presentation, the detailed description uses terms like "determine," "choose," "adjust," and "operate" to describe computer operations in a computing environment. These and other similar terms are high-level abstractions for operations performed by a computer, and should not be confused with acts performed by a human being, unless performance of an act by a human being (such as a "user") is explicitly noted. The actual computer operations corresponding to these terms vary depending on the implementation.

II. Performance Data Navigation System and Environment

Figure 2:
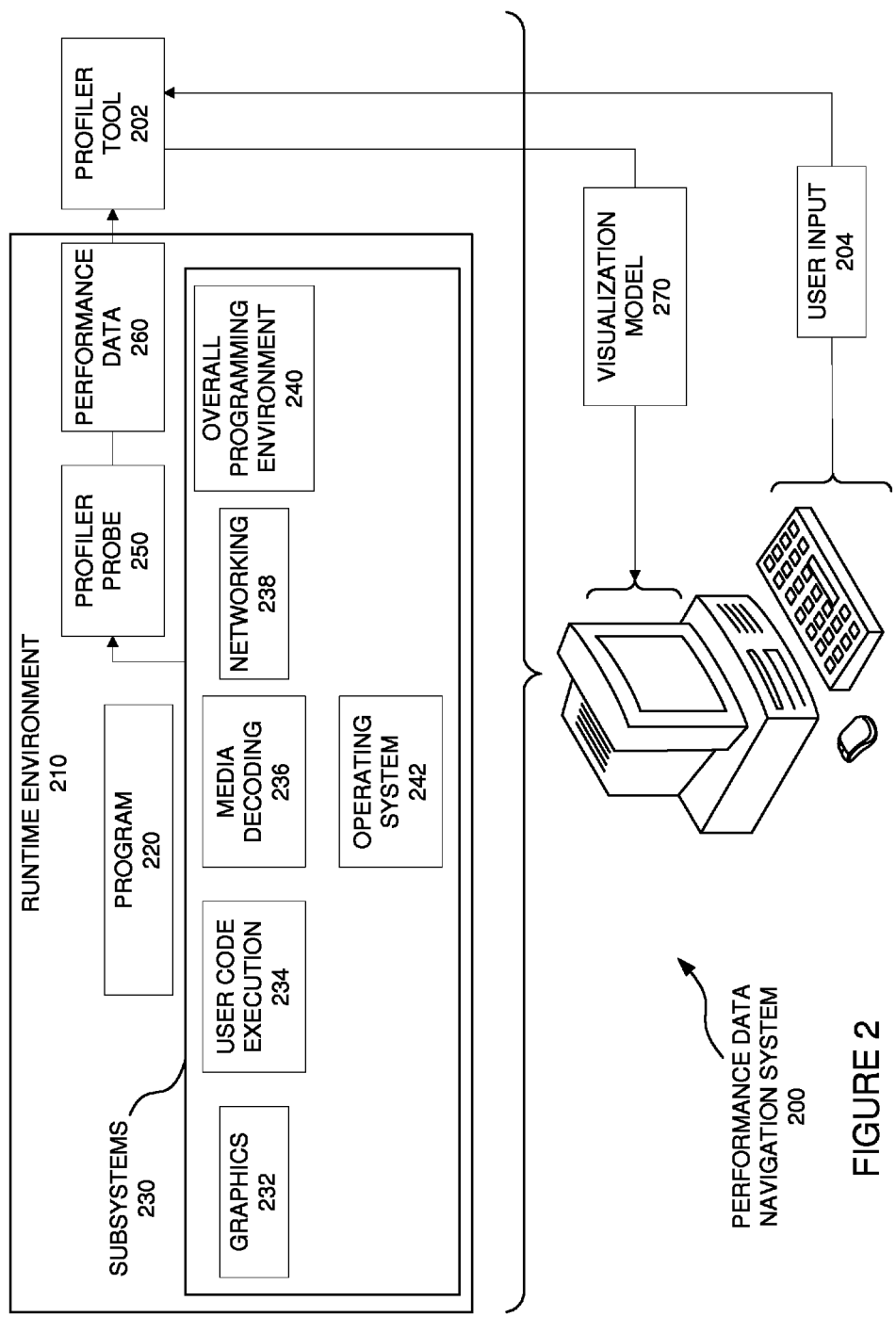
FIG. 2 is a schematic diagram of a performance data navigation system.

Referring now to FIG. 2, a performance data navigation system (200) is illustrated in schematic form. The system (200) can include a profiler tool (202), which can be a program module running in the system (200). The profiler tool (202) can receive user input (204), such as user input requesting that a runtime environment (210) be launched to run a program (220). For example, the runtime environment (210) may be a native environment in the system (200). Alternatively, the runtime environment (210) can be a virtual environment that simulates a target environment in which the program (220) is to be run after the program (220) is developed.

As the program (220) is run in the runtime environment (210), multiple different subsystems (230) in the runtime environment (210) can be involved in supporting and running the program (220). For example, the subsystems (230) may include a graphics subsystem (232), a user code execution subsystem (234), a media decoding subsystem (236), a networking subsystem (238), an overall programming environment subsystem (240), and an operating system (242). Alternatively, the operating system (242) may not be considered to be one of the subsystems (230) to be profiled in some situations, such as where the analysis is to be focused on subsystems other than the operating system (242).

A profiler probe (250) running in the runtime environment (210) can collect performance data (260) as the program (220) runs. This performance data (260) can be integrated performance data from the different subsystems (230). The profiler probe (250) can communicate the performance data (260) to the profiler tool (202), which may run outside the runtime environment (210), as illustrated. Alternatively, the profiler tool (202) may run inside the runtime environment (210), and may also act as the profiler probe (250). For example, the performance data (260) may be collected in one or more trace log files.

The profiler tool (202) can generate a visualization model (270), and can display the visualization model (270). The visualization model (270) can be an interactive model, so that user input (204) directed at elements of the model (270) can be passed to the profiler tool (202), and the profiler tool (202) can respond by altering the display of the visualization model (270). For example, user input (204) may include an indication to navigate (e.g., drill down into, or navigate across) a portion of the performance data (260) that is related to a particular performance issue represented in the visualization model (270). As an example, user input (204) may indicate that a programming element related to a performance issue is to be displayed.

Figure 3:
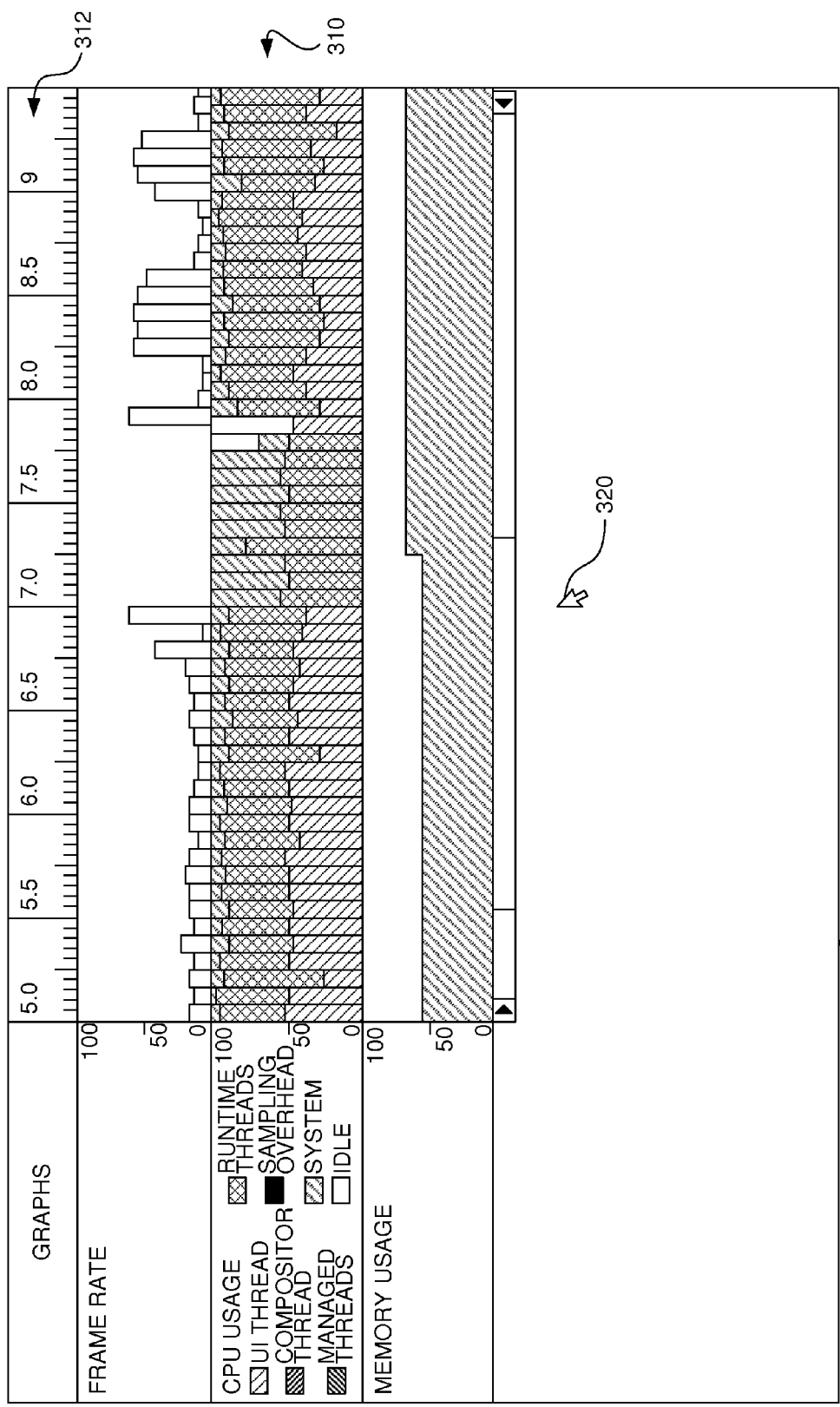
FIG. 3 is an illustration of an example of a visualization model display.

An example of navigating performance data from different subsystems will now be described with reference to FIGS. 3-5. Referring now to FIG. 3, a visualization model display (300) is illustrated. In this example, the visualization model display (300) includes three graphs (310), each illustrating performance data values along a timeline (312). Such graphs could be displayed after the underlying data was collected, as discussed above. A profiler tool can combine and analyze the performance data, and can use the resulting integrated data to construct the graphs (310). For example, the performance data may be collected in one or more trace logs, and combining and analyzing the data can include combining and analyzing information from the trace logs. The graphs (310) can include the following in this example: a top graph of frame rates at different times; a middle graph of CPU usage by different categories, including user interface thread, compositor thread, managed threads, runtime threads, sampling overhead, system, and idle; and a bottom graph of memory usage. The graphs (310) can represent data from different subsystems that are using resources, such as those subsystems (230) discussed above with reference to FIG. 2. For example, the middle graph of CPU usage can represent CPU usage by multiple different subsystems; the bottom memory usage graph can represent memory usage by multiple different subsystems, etc.

The visualization model display (300) can also include navigation features, such as one or more scroll bars and a pointer (320). These and other navigation features can be used to navigate the visualization model display (300), such as by receiving user input in the form of visual queries.

Figure 4:
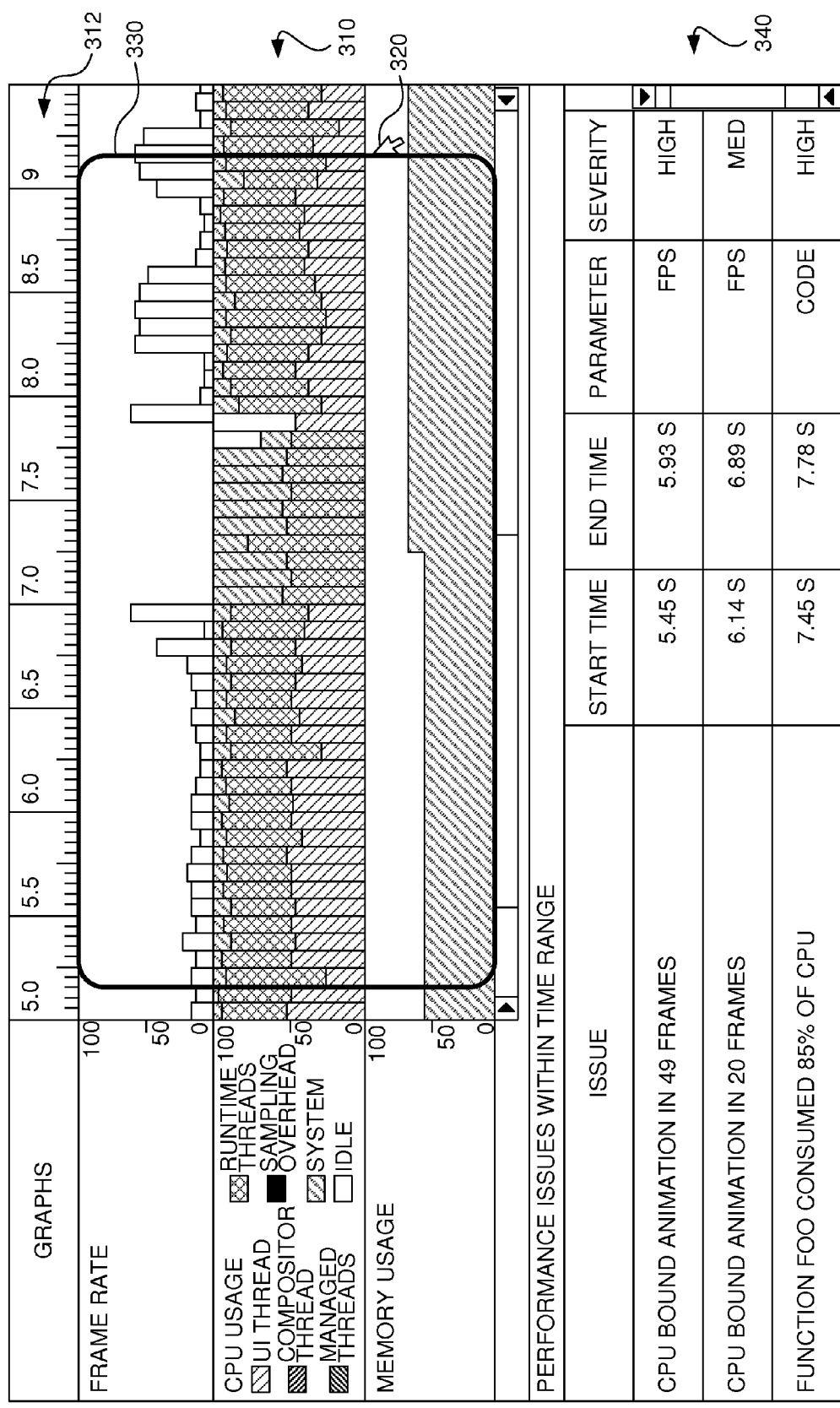
FIG. 4 is an illustration of the visualization model display of FIG. 3, but including an issues table.

As an example of navigation, and referring now to FIG. 4, the pointer (320) may be pointed and dragged in the area of the timeline (312) and/or graphs (310) to indicate a region (330) of the graphs (310) corresponding to a time range along the timeline (312). In response to this visual query, the profiler tool can analyze the performance data within the specified time range to determine whether any performance rules have been broken. For example, performance rules could specify parameter values and/or coding patterns that warrant raising warnings. For example, as illustrated in FIG. 4, the issues can include "CPU BOUND ANIMATION IN 49 FRAMES", "CPU BOUND ANIMATION IN 20 FRAMES", and "FUNCTION FOO CONSUMED 85% OF CPU". Each of these performance issues is illustrated in a row of a performance issues table (340). Each row also indicates the start and end times where the issue occurred, the parameter involved (such as frames per second (FPS), code, etc.), and the severity according to the specifications of the corresponding performance rule that was broken. The performance rules may be rules that are entered by user input, such as by user input from experienced program developers.

Accordingly, the visualization model display (300) can display to a user what the performance issues are within the visual query entered by the user (in this example a time range), even if those issues would span multiple subsystems. As an example, if the function FOO consumed 85 percent of the CPU using three different subsystems (e.g., the user code execution subsystem, the graphics subsystem, and the media decoding subsystem), the performance data from those different subsystems can be combined and analyzed to determine whether FOO used more of the CPU than a percentage specified in a performance rule. The issues table (340) may also include additional information, such as suggestions as to how the performance issue can be fixed, if such a suggestion is available. For example, a performance issue rule may detect a particular coding pattern that can be detrimental to performance, and the corresponding issue table row for that entry can include a suggestion as to how the coding pattern may be improved.

User input can be provided to navigate the issues table (340), and to drill down farther into the displayed performance issues. For example, a user may provide user input requesting that the profiling tool drill down into a selected issue by displaying threadwise functions related to one of the performance issues. For example, the pointer (320) may be moved over the selected row in the issues table (340), an indication such as a right mouse click may indicate a request to display a menu of selections, and the pointer (320) can move over and click a menu item to drill down. If the performance issue relates to a particular programming element, the menu of selections could include an entry for "VIEW SOURCE", which can be selected to reveal the programming element, such as source code if the programming element is written in a source code language.

As another example, the menu of selections may include selections for other information that can be drilled into, such as a menu entry for threadwise functions. If the threadwise functions entry is selected, that drill-down visual query could result in the profiler tool drilling down into the selected issue and replacing the issues table (340) with a threadwise functions table (350), as illustrated in FIG. 5.

The threadwise functions table (350) can include a row for each threadwise function related to the selected performance issue, and can also include additional information about that threadwise function, such as illustrations of performance data related to the threadwise function, an identifier of the thread where that function was running, etc.

Figure 5:
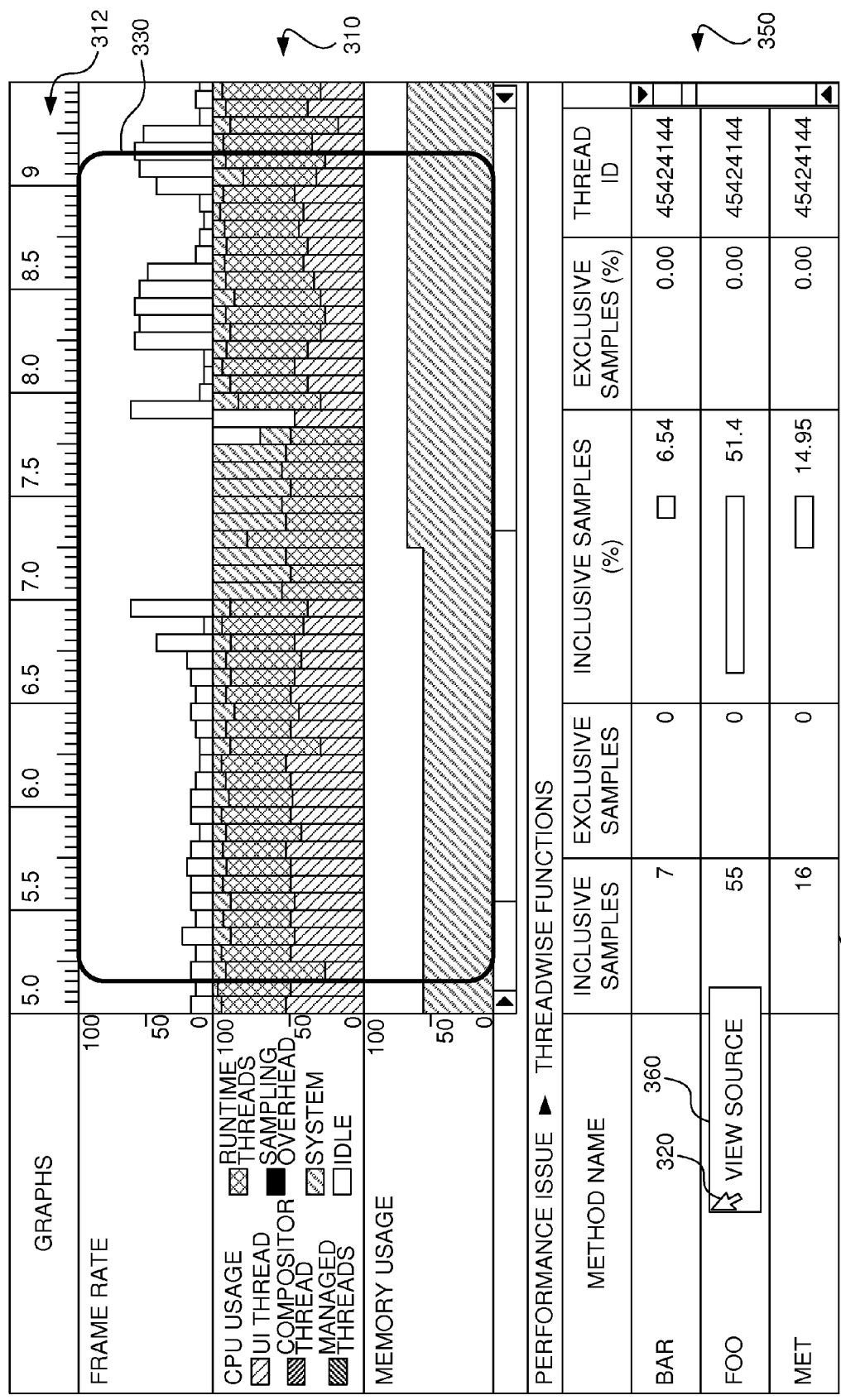
FIG. 5 is an illustration of the visualization model display of FIG. 4, but with the issues table replaced by a threadwise functions table.

Referring still to FIG. 5, the pointer (320) can be moved to a selected function row, and a right click indication can raise a menu of selections (360) related to the function of the selected row. For example, as illustrated, the menu of selections (360) can include an entry "VIEW SOURCE", which can be selected to produce a display of a programming element for the selected function ("FOO" in the illustration of FIG. 5). The menu of selections (360) is illustrated with just one entry, but it could include additional entries indicating other ways in which the profiler tool can drill into the performance data related to the entry in response to user input directed at the entry. The displayed programming element can be modified by providing user input, and the modified programming element may improve performance of the computer program being profiled.

The above discussion of FIGS. 3-5 is provided as a specific example, and it should be appreciated that the techniques and tools discussed herein are not limited to this example. For example, the tools and techniques could apply to different display layouts, different graphical representations of performance data, different types of performance issues, different techniques for indicating visual queries, etc. It should also be appreciated that the techniques described herein may be used for a wide variety of different types of programs, such as programs for servers, desktop computers, mobile handheld devices, etc.

III. Resource Cost Correlation Across Different Subsystems

Tools and techniques for correlating performance data such as resource cost data across different subsystems will now be discussed. Also discussed in this section will be analysis that can be performed using such correlations. Such analysis may be used to carry out the queries such as visual queries of performance data discussed herein.

A profiler probe running in the runtime environment can collect data including cost data as the program runs. This cost data can be integrated cost data from the different subsystems. The profiler probe can communicate the cost data to the profiler tool, which may run outside the runtime environment, as illustrated. Alternatively, the profiler tool may run inside the runtime environment, and may also act as the profiler probe. As an example, the cost data may be collected in one or more trace log files.

The profiler may use the collected data including the cost data to construct one or more model state data structure(s) that can be used to map items from the cost data to the actual state data structure(s), which can include or be mapped to the programming elements of the program. A model state data structure can match a corresponding actual state data structure. For example, if an actual state data structure is a tree data structure, the matching model state data structure may also be a tree data structure.

As an example of constructing a model state data structure, the cost data may be included in an execution trace log file generated while running the program. The cost data and the other collected data in that trace file can come from multiple different subsystems. The profiler probe may insert markers in the code of the program, so that such markers trigger events that are recorded in the trace log file. The data for each such event may include a system clock time (wall clock time) for the event. For example, a log entry for an execution time on a processor may include start and/or stop system wall clock times. For resource usage that is measured in units of time, a log entry may also include a resource time for the particular trace. For example, the entry may indicate an amount of execution time on a GPU or CPU. Log entries may also include other information, such as the amount of memory allocated for a particular element corresponding to an element of a state data structure, a frame rate at a particular wall clock time, etc. Because the log file can include such resource usage entries from all the different subsystems that are to be included in the profile, those usages can be combined to reveal the overall resource usage by imperative components being profiled in the runtime environment.

The cost data may also include some unwanted data, such as data from resource usage by the profiler probe as the probe collects the cost data. Such unwanted cost data may be identified and subtracted out by the profiler probe and/or the profiler tool. This may be done by actually measuring costs contributed by the profiler probe. However, measuring the costs of the profiler probe may introduce even more unwanted costs. Accordingly, the unwanted costs may be quantified in some other manner, such as by estimating costs contributed by the profiler probe. For example, estimates can be based on how many cost samples were taken by the profiler probe and/or based on some other information. Rather than actually subtracting out the costs, information about unwanted costs may be presented along with representations of the cost data itself. For example, information on tolerances for the cost data may be presented.

As noted above, the cost data can reveal the costs of the imperative elements from the runtime environment. However, at least some of those imperative elements may not be actual programming elements of the program. For example, where the programming elements are declarative programming elements, the subsystems of the runtime environment may execute those declarative programming elements by invoking imperative elements of the runtime environment that specify how tasks identified by the declarative programming are to be executed. Accordingly, the profiler tool may include tools that that correspond to designs in the runtime environment, and those tools can identify conditions that would have been caused by the particular runtime environment executing particular types of declarative programming elements from the program. For example, declarative languages are often exhibited by corresponding engines. Using a knowledge of how an engine works and of a profile of time taken by particular components in the runtime environment when running the program, a mapping can be generated of what declarative elements would have caused the time and component profile. Accordingly, tools may be used to construct the model state data structure, which can represent a state data structure that could have produced the collected data including the cost data.

The model state data structure may include elements that correspond to different types of declarative programming elements, and may also include some elements that correspond to types of imperative programming elements. Accordingly, the model state data structure(s) can match the actual state data structure(s) that were present when the program was running in the runtime environment. Thus, elements of the model state data structures, which are already matched to items in the cost data can be matched to structures in the program that include the programming elements.

Accordingly, the profiler tool can use the model state data structure(s) to match items in the cost data to the programming elements in the program, even when those programming elements are declarative elements. That matching can be used to construct the correlation data structure, which can correlate the cost data for different subsystems and can also attribute items in the cost data to the matching programming elements. The cost data for different subsystems may be correlated using timing information from the trace log file, which can also be included in the correlation data structure. For example, items of the cost data identifying memory usage by different subsystems at a particular wall clock time may be combined and summed to reveal an overall memory usage for that time. The correlation data structure may include one or more tables, such as a table for each type of cost being profiled (e.g., one table for memory usage, one table for GPU usage, one table for CPU usage, etc.).

As noted above, the correlation data structure can correlate cost data from different subsystems. For example, consider a declarative programming element that indicates a text box. The user code execution subsystem, the graphics subsystem, and the GPU may each have memory allocated for the text box. Accordingly, to calculate how much memory the text box programming element is using, information from the different subsystems can be combined. The memory usage by different subsystems can be tracked by tracking what objects are allocated by what other objects. For example, object A may be allocated by the user code, object A may allocate object B, object B may allocate object C, etc. And these objects may be allocated in different subsystems. The tracking of this allocation can be maintained down to the processor level (e.g., including memory allocated in the GPU). These allocations from different subsystems can then be correlated to the object that was allocated by the programming element in the memory table. Also, the memory table may include an indication of a subsystem (e.g., user code execution subsystem, graphics subsystem, GPU subsystem, etc.) from which an item of memory allocation was derived.

The correlation data structure can include multiple different sub-structures, such as multiple different tables that can be constructed from trace file information using knowledge of the design of the runtime environment. For example, one table may include a graph that maps between different objects from the runtime environment. For example, that graph can identify relationships such as parent-child relationships between the objects. That graph may be used in constructing the model state data structure(s). Other tables correlate items of resource usage by time and may attribute each usage item to a programming element that was responsible for the usage. For example, tables in the correlation data structure may include a table that maps memory usage to objects, a table that maps GPU usage to objects, a table that maps CPU usage to objects, etc.

The correlation data structure can be analyzed to provide information related to the costs attributed to the programming elements. For example, the profiler tool may apply a series of filters and/or analyzers to the data in the correlation data structure. This filtering and/or analysis may be done in response to user input.

The analyzers and filters may be applied in various ways. One example of an analyzer flow will now be discussed. In the analyzer flow, a first dataset context can include various data items. The first dataset context may be an initial dataset context before other filters or analyzers have been applied, or the first dataset context may be received from a previous filter or analyzer. The first dataset context can include a first current dataset, which can be a dataset that results from previous filters and/or analyzers being applied to the cost data in the correlation data structure. The first dataset context can also include a first history, which can represent a history of analyzers and/or filters that were already applied to produce the first current dataset. The first dataset context can also include a base time filter, which can filter the data to be within a specified range of time (such as a range of system wall clock time). The first dataset context can also include a correlation data structure, which may be the same as the correlation data structure discussed above. The first current dataset, or at least a portion of the first current dataset, may be presented to a user, such as by displaying a representation of at least a portion of the first current dataset.

The first dataset context can be provided to a first analyzer, which may be a component of the profiler tool. For example, this may be done in response to receiving user input. The first analyzer can analyze the first dataset context to produce a second dataset context, which can include an updated second current dataset, and updated second history (which can be updated to indicate that the first analyzer had analyzed the data), the base time filter, and the correlation data structure. The second current dataset, or at least a portion of the second current dataset, may be presented to a user, such as by displaying a representation of at least a portion of the second current dataset. The second dataset context can be provided to a second analyzer, and the second analyzer can analyze the second dataset context to produce a third dataset context. For example, this may be done in response to user input. The third dataset context can include an updated third current dataset, an updated third history, the base time filter, and the correlation data structure. The third current dataset, or at least a portion of the third current dataset, may be presented to a user, such as by displaying a representation of at least a portion of the third current dataset. This sequence of displaying a current dataset, providing the current dataset to another analyzer, having the analyzer analyze the dataset context to produce another current dataset, and then displaying that current dataset may continue beyond what is specifically described here. For example, the sequence may continue until a programming element is identified and displayed so that a user can edit that programming element.

As one example of an analysis, consider a situation where a frame rate drops too low while the program is running. The low frame rate could cause a display screen to flicker. Such a low frame rate could be caused by one or more of many things (e.g., other program(s) using too many resources, the cost of executing the current display screen being too high, some other thread in the program using too many resources, etc.). The first analyzer may be able to reveal that between system wall clock times t=1 and t=2, the problem resulted from the complexity of a visual tree structure. The second analyzer may be able to analyze between times t=1 and t=2 to determine which programming elements of the visual tree structure are incurring the largest resource costs during that time period. An additional third analyzer (not shown) may be invoked to reveal which animations (which can themselves be programming elements) are causing the properties of those high cost programming elements to change during this time period. When representations of the animation programming elements are displayed as part of a resulting current dataset from the third analyzer, user input may be provided to click on the representation of an animation programming element to reveal the animation programming element itself. The animation programming element can then be edited. In each of the levels of analysis, user input may be provided to drill down further and invoke additional analyzers to assemble and display datasets.

The analyzers can perform various different types of analyses on the cost data. For example, one analyzer may receive data within a specified time period and determine what elements are being modified during that time. Another analyzer may receive elements that have been modified, and that analyzer may yield the storyboards that were causing the elements to be modified. Another analyzer may sort data to see which has the greatest resource cost (most execution time, most memory, etc.). A declarative model may be used by the profiler tool to indicate what analyzers are applicable in specified situations. For example, available analyzers may be limited to different aspects depending what type of resource cost or usage is being analyzed and what associated sub-structure of the correlation data structure will be used (frame rate table, memory usage table, CPU usage table, GPU usage table, etc.).

IV. Techniques for Navigating Performance Data from Different Subsystems

Several techniques for navigating performance data from different subsystems will now be discussed. Each of these techniques can be performed in a computing environment. For example, each technique may be performed in a computer system that includes at least one processor and at least one memory including instructions stored thereon that when executed by the at least one processor cause the at least one processor to perform the technique (one or more memories store instructions (e.g., object code), and when the processor(s) execute(s) those instructions, the processor(s) perform(s) the technique). Similarly, one or more computer-readable storage media may have computer-executable instructions embodied thereon that, when executed by at least one processor, cause the at least one processor to perform the technique.

Figure 6:
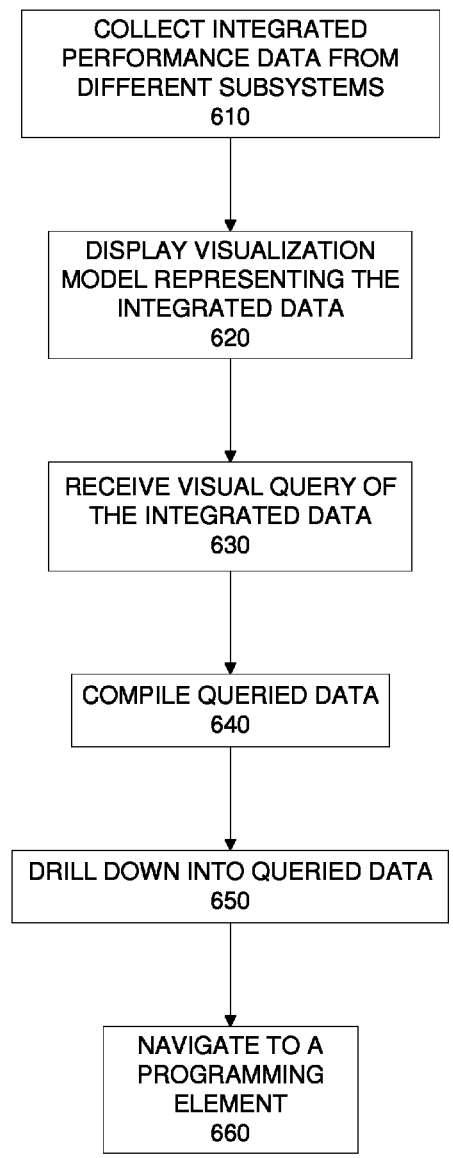
FIG. 6 is a flowchart of a technique for navigating performance data from different subsystems.

Referring to FIG. 6, a technique for navigating performance data from different subsystems will be described. The technique can include collecting (610) performance data from a plurality of different runtime environment subsystems of a computer system while the computer system is running a program in the runtime environment. A visualization model representing the integrated data can be displayed (620), and a visual query of the integrated data can be received (630) at the visualization model. Queried data can be compiled (640) in response to the visual query. For example, compiling (640) can include combining data of similar types, even if the data comes from different subsystems. As an example, threadwise functions can be combined into a list even if the threadwise functions stem from different subsystems, so long as the threadwise functions meet the parameters of the visual query. The technique of FIG. 6 can further include drilling down (650) into the queried data in response to user input. Additionally, in response to a navigation request directed at the visualization model, the technique can include navigating (660) to a programming element related to a portion of the queried data.

Referring still to FIG. 6, receiving (630) the visual query can include receiving user input directed at a displayed element of the visualization model. The visualization model may include multiple different visualization elements, such as one or more graphs representing quantitative performance data values. The visualization model may also include at least one textual data element displayed along with the graph(s). The technique can include navigating across the queried data, such as by scrolling a table or list of data, or scrolling a graph.

The visual query may be a first visual query, and the queried data may be a first set of queried data. Drilling down (650) into the first set of queried data can include receiving user input directed at a visual element representing at least a portion of the queried data. In response to the user input directed at the visual element, more information about performance data represented by the visual element may be displayed than had been displayed previously.

The plurality of subsystems may include a first subsystem and a second subsystem, where each of these two subsystems are selected from a group consisting of a graphics subsystem, a user code execution subsystem, a media decoding subsystem, a networking subsystem, an overall programming environment, and combinations thereof. The programming element may be in a declarative programming language. For example, the programming element may be in a declarative programming language that allows user interface elements to be defined in a declarative manner, such as the XAML programming language. Alternatively, the programming element may be in an imperative programming language.

The navigation request may include user input selecting a visual element that represents a set of performance data representing resource usage caused, at least in part, by the programming element. For example, the programming element may be source code for invoking a function, and the function may be a function that contributed to resource usage (e.g., processor or memory usage) represented by the set of performance data. An indication of a type of problem with the programming element may be displayed. For example, an analysis of the performance data may reveal a pattern that indicates a problem with a particular programming element, and an indication of that problem may be displayed. Such patterns, like other performance rules discussed herein, may be specified by users such as experienced program developers.

The queried data may include a list of one or more performance issues within parameters indicated by the visual query, such as within a time period indicated by the visual query.

Figure 7:
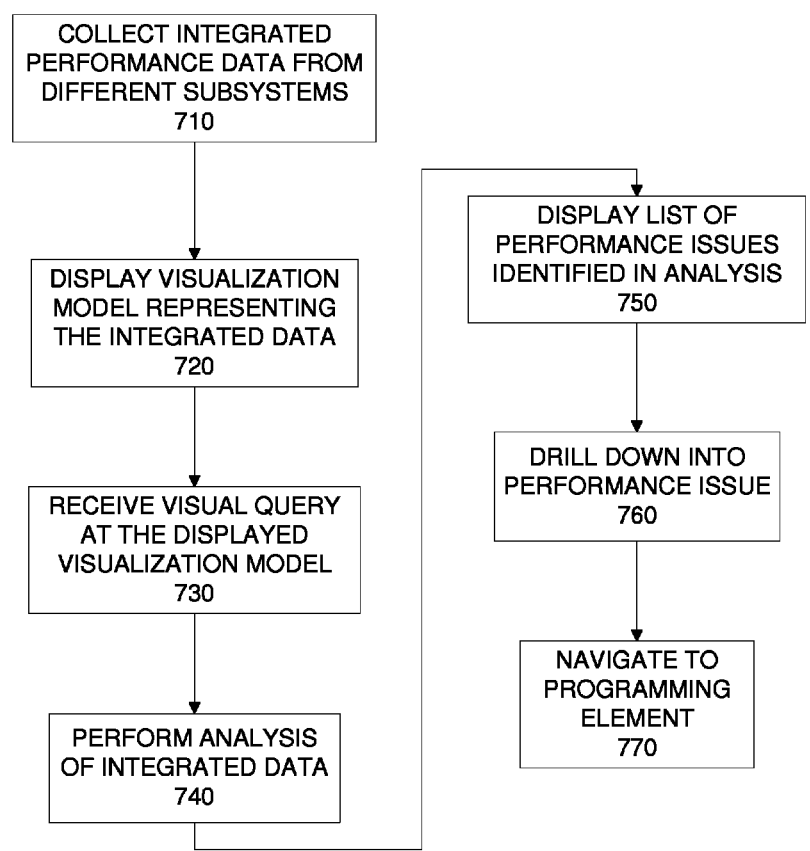
FIG. 7 is flowchart of another technique for navigating performance data from different subsystems.

Referring now to FIG. 7, another technique for navigating performance data from different subsystems will be described. The technique can include collecting (710) integrated performance data from a plurality of different runtime environment subsystems of a computer system while the computer system is running a program in the runtime environment. A visualization model representing the integrated data from the subsystems can be displayed (720). A visual query can be received (730) at the displayed visualization model. Additionally, in response to the query, an analysis of at least a portion of the integrated data meeting one or more parameters of the visual query can be performed (740). A list of one or more performance issues identified in the analysis can be displayed (750). The technique can also include drilling down (760) into a performance issue in response to user input selecting the performance issue from the list. Drilling down (760) can include displaying a representation of a programming element related to the performance issue. The technique can include navigating (770) to the programming element in response to user input directed at the representation of the programming element.

The visualization model in the technique of FIG. 7 can include one or more graphs, and the model may also include one or more textual data elements displayed along with the graph(s). The graph(s) may be bar graphs as illustrated in FIGS. 3-5 discussed above and/or other type(s) of graph(s). For example, the graph(s) could include one or more bar graphs, line graphs, scatter plots, pie charts, etc.

The technique of FIG. 7 may further included editing the programming element in response to user input. For example, the programming element may be edited to improve a performance issue identified in the visualization model. Additionally, the technique may include displaying an indication of a type of problem with the programming element, and the technique may further include an indication of a technique for improving the problem by modifying the programming element.

Drilling down into a performance issue may include receiving a user input selecting a visual element from among a plurality of displayed visual elements related to the performance issue. In response to that user input, the technique can include displaying more information about performance data represented by the visual element than had been displayed previously.

Figure 8:
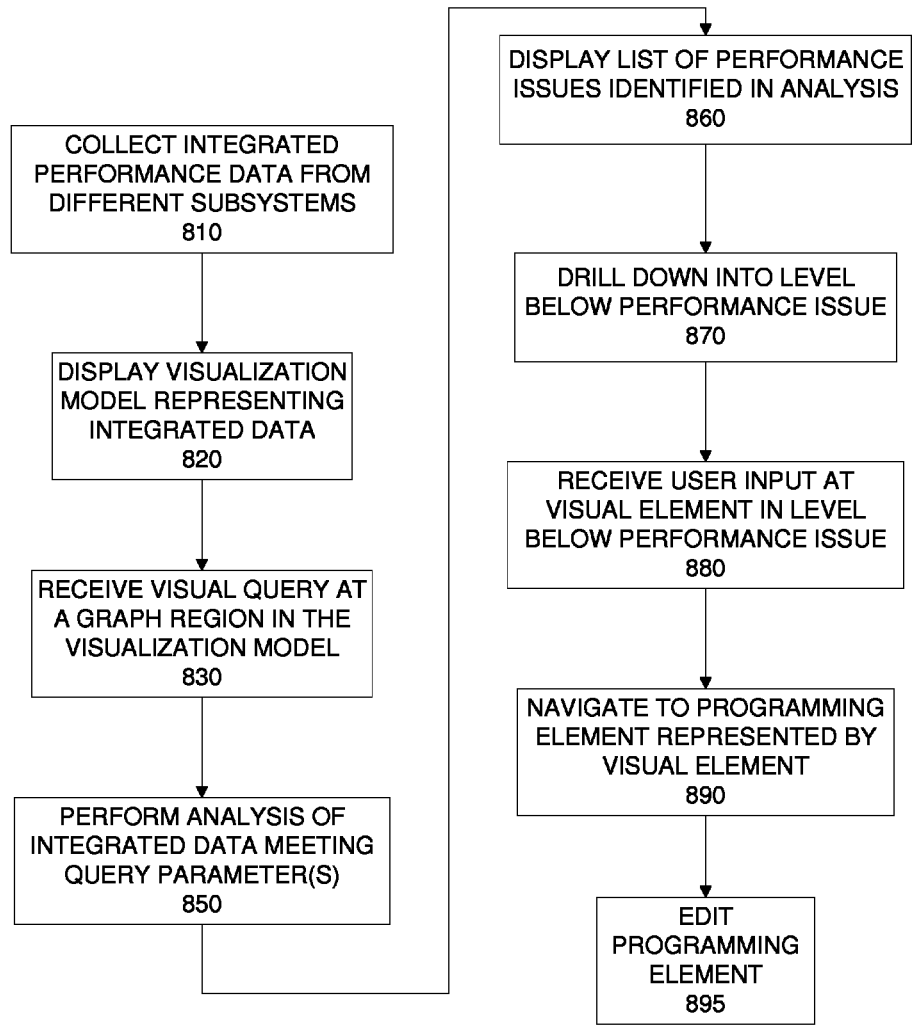
FIG. 8 is a flowchart of yet another technique for navigating performance data from different subsystems.

Referring to FIG. 8, yet another technique for navigating performance data from different subsystems will be described. The technique can include collecting (810) integrated performance data from a plurality of different runtime environment subsystems of a computer system while the computer system is running a program in the runtime environment. The runtime environment may be a virtual environment, such as a virtual environment that simulates a target environment for which the program is being developed. The subsystems can include at least two subsystems selected from a group consisting of a graphics subsystem, a user code execution subsystem, a media decoding subsystem, a networking subsystem, an overall programming environment, and combinations thereof. A visualization model representing integrated data from the plurality of subsystems can be displayed (820). The visualization model can include one or more data graphs and one or more textual data elements.

A visual query can be received (830) at a region of the data graph(s). The visual query can be limited to the region. In response to the query, an analysis of at least a portion of the integrated data meeting one or more parameters of the visual query can be performed (850). A list of one or more performance issues identified in the analysis can be displayed (860).

The technique can also include drilling down (870) into a level that is below a performance issue of the one or more performance issues in response to user input selecting the performance issue from the list. User input can be received (880) in the level below the performance issue, and the visual element can represent a programming element at least partially contributing to the performance issue. In response to the user input at the visual element, the technique can include navigating (890) to the programming element. Additionally, the programming element can be edited (895) in response to user input.

Visual queries can be defined in various ways, such as by selections on graphs, selections in data set views presented to the user so far in the navigation stack (including the ones presented in a performance summary), and/or filters or other queries that are set to be applied to restrict the results and define the actual set of results to be compiled and displayed.

To carry out the visual queries, the analyzers discussed above can analyze the performance data using the data structures noted above. These data structures can include, for example, the correlation data structure and a current dataset of performance data, which can include cost data. For example, when user input is provided to request a visual query, the performance data can be analyzed by an analyzer that corresponds to a selection (e.g., a menu selection) made by the user input. The dataset resulting from that analysis can be provided as the results of the visual query. The input to the analyzer may include the dataset that has been defined by previous user input selections (the existing current dataset), and that dataset can be further analyzed using the correlation data structure. Thus, for example, the analyzer may further restrict the existing current dataset by applying additional query restrictions. The technique of applying additional restrictions in a series of visual queries (and a series of analyzers to carry out those queries) using the correlation data structure may be continued until an actual programming element is displayed.

The list of selection options such as menu selection options discussed above (e.g., the menu of selections (360) discussed above with reference to FIG. 3) can be based on what analyzers are available to carry out such selections, because some analyzers may not be configured to operate in some situations. For example, the list of options (e.g., menu selections) can be based on the set of analyzers that can mine and provide information about a current selection on the displayed visualization model display (300) based on the history of navigation, the performance data collected, and/or the data structures derived from the execution trace.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A computer-implemented method, comprising:
   collecting integrated performance data from a plurality of different runtime environment subsystems of a computer system while the computer system is running a program in a runtime environment, at least a portion of the integrated data representing performance of the running of the program, the running of the program while the integrated performance data is being collected comprising executing a programming element of the program, the execution of the programming element of the program contributing to the performance of the running of the program that is represented by the integrated data;
   displaying a visualization model representing the integrated data from the plurality of subsystems, with the visualization model comprising a data graph representing quantitative performance data values along a time line, and with the quantitative performance data values representing performance of multiple different subsystems of the plurality of different runtime environment subsystems that are using resources;
   receiving a visual query of the integrated data at the visualization model;
   compiling queried data in response to the visual query, with the compiling comprising combining data of similar types from multiple subsystems of the plurality of subsystems;
   drilling down into the queried data in response to user input; and
   in response to a navigation request directed at the visualization model, navigating to the programming element of the program, the programming element being related to at least a portion of the queried data.

2. The method of claim 1, wherein receiving the visual query comprises receiving user input directed at a displayed element of the visualization model.

3. The method of claim 1, wherein the visualization model further comprises at least one textual data element displayed along with the data graph.

4. The method of claim 1, further comprising navigating across the queried data.

5. The method of claim 1, wherein drilling down into the queried data comprises:
   receiving user input directed at a visual element representing at least a portion of the queried data; and
   in response to the user input directed at the visual element, displaying more information about performance data represented by the visual element than had been displayed previously.

6. The method of claim 1, wherein the plurality of subsystems comprise a first subsystem selected from a group consisting of a graphics subsystem, a user code execution subsystem, a media decoding subsystem, a networking subsystem, an overall programming environment and combinations thereof.

7. The method of claim 6, wherein the plurality of subsystems further comprise a second subsystem that is different from the first subsystem, the second subsystem selected from the group consisting of a graphics subsystem, user code execution subsystem, a media decoding subsystem, a networking subsystem, an overall programming environment and combinations thereof.

8. The method of claim 1, wherein the navigation request comprises user input selecting a visual element that represents a set of performance data representing resource usage caused at least in part by the programming element.

9. The method of claim 1, further comprising displaying an indication of a type of problem with the programming element.

10. The method of claim 1, wherein the queried data comprises a list of one or more performance issues within parameters indicated by the visual query.

11. The method of claim 1, wherein the programming element comprises code, the code comprising at least one of script and source code, wherein navigating to the programming element comprises displaying at least a portion of the code of the programming element in a display area, and wherein the method further comprises modifying the code of the programming element in response to user input received while the code is displayed in the display area.

12. A computer system comprising:
   at least one hardware processor; and
   at least one memory comprising instructions stored thereon that when executed by the at least one processor cause the at least one processor to perform acts comprising:
     collecting integrated performance data from a plurality of different runtime environment subsystems of a computer system while the computer system is running a program in a runtime environment, at least a portion of the integrated data representing performance of the running of the program, the running of the program while the integrated performance data is being collected comprising executing a programming element of the program, the execution of the programming element of the program contributing to the performance of the running of the program that is represented by the integrated data;
     displaying a visualization model representing the integrated data from the plurality of subsystems, with the visualization model comprising a data graph representing quantitative performance data values along a timeline, and with the quantitative performance data values representing performance of multiple different subsystems of the plurality of different runtime environment subsystems that are using resources;
     receiving a visual query at the visualization model;
     in response to the visual query, performing an analysis of at least a portion of the integrated performance data that meets one or more parameters of the visual query, the analysis including determining that the integrated performance data indicates that one or more performance rules have been broken within the one or more parameters of the visual query, and the analysis further including identifying one or more instances of broken performance rules as one or more performance issues;
     displaying a list of the one or more performance issues identified in the analysis;
     drilling down into a performance issue in response to user input selecting the performance issue from the displayed list, drilling down including displaying a representation of the programming element of the program, the execution of the programming element having contributed to the selected performance issue; and in response to user input directed at the representation of the programming element, navigating to the programming element.

13. The computer system of claim 12, wherein the visualization model further comprises one or more textual data elements displayed along with the one or more data graphs.

14. The computer system of claim 12, wherein receiving the visual query comprises receiving user input indicating a region of the one or more data graphs.

15. The computer system of claim 12, wherein the acts further comprise editing the programming element in response to user input.

16. The computer system of claim 12, wherein the acts further comprise displaying an indication of a type of problem with the programming element.

17. The computer system of claim 12, wherein drilling down into one of the one or more performance issues comprises:

receiving a user input selecting a visual element from among a plurality of displayed visual elements related to the performance issue; and in response to the user input selecting the visual element, displaying more information about performance data represented by the visual element than had been displayed previously.

18. A computer system comprising:

at least one hardware processor; and at least one memory comprising instructions stored thereon that when executed by the at least one processor cause the at least one processor to perform acts comprising:

collecting integrated performance data from a plurality of different runtime environment subsystems of a computer system while the computer system is running a program in a runtime environment, at least a portion of the performance data representing performance of the running of the program, the running of the program while the integrated performance data is being collected comprising executing a programming element of the program, the execution of the programming element of the program contributing to the performance of the running of the program that is represented by the integrated data;

displaying a visualization model representing the integrated data from the plurality of subsystems, with the visualization model comprising a data graph representing quantitative performance data values along a time line, and with the quantitative performance data values representing performance of multiple different subsystems of the plurality of different runtime environment subsystems that are using resources;

receiving a visual query of the integrated data at the visualization model;

compiling queried data in response to the visual query, with the compiling comprising combining data of similar types from multiple subsystems of the plurality of subsystems;

drilling down into the queried data in response to user input; and in response to a navigation request directed at the visualization model, navigating to the programming element of the program, the programming element being related to at least a portion of the queried data.

19. The computer system of claim 18, wherein the programming element is a declarative programming element.

20. The computer system of claim 18, wherein receiving the visual query comprises receiving user input directed at a displayed element of the visualization model.

* * * * *